United States Patent
Jung

(10) Patent No.: US 8,982,284 B2
(45) Date of Patent: Mar. 17, 2015

(54) REMOTE CONTROLLER FOR SETTING MODE ACCORDING TO STATE OF BROADCAST RECEIVING APPARATUS

(75) Inventor: Young-mi Jung, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1279 days.

(21) Appl. No.: 12/119,756

(22) Filed: May 13, 2008

(65) Prior Publication Data

US 2009/0122206 A1     May 14, 2009

(30) Foreign Application Priority Data

Nov. 8, 2007    (KR) ...................... 10-2007-0113885

(51) Int. Cl.
*H04N 5/44*     (2011.01)
*H04N 21/422*     (2011.01)
*H04N 5/63*     (2006.01)

(52) U.S. Cl.
CPC ....... *H04N 5/4403* (2013.01); *H04N 21/42207* (2013.01); *H04N 21/42208* (2013.01); *H04N 5/63* (2013.01); *H04N 2005/4407* (2013.01); *H04N 2005/4408* (2013.01); *H04N 21/42222* (2013.01)
USPC .......................................... 348/734; 348/730

(58) Field of Classification Search
USPC ......... 348/734, 553–555, 730, 725, 563–569; 340/825.72, 825.69, 310.01, 310.11
IPC ........................................................ H04N 5/44
See application file for complete search history.

(56) References Cited

U.S. PATENT DOCUMENTS

| | | | |
|---|---|---|---|
| 5,684,526 A * | 11/1997 | Yoshinobu | 725/131 |
| 5,774,187 A * | 6/1998 | Tsunoda | 348/553 |
| 6,011,546 A | 1/2000 | Bertram | |
| 6,407,779 B1 | 6/2002 | Herz | |
| 7,009,528 B2 * | 3/2006 | Griep | 340/12.54 |
| 7,889,175 B2 * | 2/2011 | Kryze et al. | 345/156 |
| 8,578,429 B2 * | 11/2013 | Lim et al. | 725/81 |
| 2004/0169590 A1 * | 9/2004 | Haughawout et al. | 340/825.72 |
| 2004/0181292 A1 | 9/2004 | Ha et al. | |
| 2006/0158571 A1 * | 7/2006 | Tsunoda et al. | 348/734 |
| 2006/0221522 A1 | 10/2006 | Furuta | |

(Continued)

FOREIGN PATENT DOCUMENTS

| | | | | |
|---|---|---|---|---|
| JP | 10336758 A | | 12/1998 | |
| JP | 2001-268658 | * | 9/2001 | ............... H04N 5/00 |

(Continued)

OTHER PUBLICATIONS

Search Report issued on Jun. 21, 2010 from the European Patent Office in counterpart European Application No. 08157965.8.

(Continued)

*Primary Examiner* — Trang U Tran
(74) *Attorney, Agent, or Firm* — Sughrue Mion, PLLC

(57) ABSTRACT

A remote control apparatus for setting a mode according to a state of a broadcast receiving apparatus is provided. The remote control apparatus sets operation modes based on information regarding a state of a broadcast receiving apparatus received from the broadcast receiving apparatus. The operation mode of the remote control apparatus is automatically set based on information regarding a state of a broadcast receiving apparatus, so less power is consumed in the remote control apparatus.

24 Claims, 4 Drawing Sheets

(56) References Cited

U.S. PATENT DOCUMENTS

2006/0267726 A1   11/2006  Arai et al.
2007/0185968 A1    8/2007  White et al.
2009/0303097 A1   12/2009  Reams et al.

FOREIGN PATENT DOCUMENTS

| | | |
|---|---|---|
| JP | 2001-268658 A | 9/2001 |
| JP | 2007174031 A | 7/2007 |
| KR | 200141732 Y1 | 6/1997 |
| KR | 2000-0037655 A | 7/2000 |
| KR | 1020020023022 A | 3/2002 |
| KR | 1020020067008 A | 8/2002 |
| KR | 1020030000580 A | 1/2003 |
| KR | 10-2005-0051714 A | 6/2005 |
| WO | 2007/023437 A2 | 3/2007 |

OTHER PUBLICATIONS

Communication, dated Sep. 30, 2013, issued by the Korean Patent Office in counterpart Korean Application No. 10-2007-0113885.

Hitachi Ltd., et al., "HDMI Specification Version 1.3a", Internet Citation, Nov. 10, 2006, XP002476103, total 276 pages, Retrieved from the Internet: URL:http://www.hdmi.org/download/HDMISpecificationl3a.pdf.

Communication from the European Patent Office issued May 27, 2014 in a counterpart European Application No. 13189212.7.

Communication dated Sep. 5, 2014 issued by the Korean Intellectual Property Office in counterpart Korean Patent Application No. 10-2014-0065124.

Communication, Issued by the Korean Intellectual Property Office, Dated Dec. 8, 2014, In counterpart Korean Application No. 10-2007-0113885.

* cited by examiner

REMOTE CONTROLLER FOR SETTING MODE ACCORDING TO STATE OF BROADCAST RECEIVING APPARATUS

CROSS-REFERENCE TO RELATED APPLICATIONS

This application claims priority from Korean Patent Application No. 10-2007-0113885, filed on Nov. 8, 2007 in the Korean Intellectual Property Office, the disclosure of which is incorporated herein by reference in its entirety.

BACKGROUND OF THE INVENTION

1. Field of the Invention

Apparatuses consistent with the present invention relate to a remote controller, and more particularly, to a remote controller which receives a user command for controlling a broadcast receiving apparatus, and transmits the received command to the broadcast receiving apparatus.

2. Description of the Related Art

A remote controller is an electronic device used for the remote operation of a machine. The remote controller is widely used to manipulate a television (TV).

The remote controller transmits a command received from a user to a TV via infrared (IR) radiation. IR radiation is electromagnetic radiation of a wavelength shorter than that of microwaves. IR radiation cannot penetrate objects, and is inappropriate to transfer massive information.

To solve above drawbacks, a remote controller using radio frequency (RF) communication is provided. However, the type of remote controller has increase power consumption.

Therefore, a method is required, which causes a remote controller to consume less power.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a remote control apparatus which sets an operation mode according to information regarding a state of a broadcast receiving apparatus received from the broadcast receiving apparatus to reduce power consumption, and a method for setting a mode thereof.

The present invention also provides a broadcast receiving apparatus which transmits information regarding a state of the broadcast receiving apparatus to a remote control apparatus in order to set an operation mode of the remote control apparatus according to the information regarding the state of the broadcast receiving apparatus.

According to an exemplary aspect of the present invention, there is provided a remote control apparatus, comprising a communication module which is connected to a broadcast receiving apparatus for communication; a user input unit which receives a user command regarding the broadcast receiving apparatus; and a controller which transmits the user command input through the user input unit to the broadcast receiving apparatus through the communication module, and sets an operation mode according to information regarding a state of the broadcast receiving apparatus received from the broadcast receiving apparatus through the communication module.

If it is determined that the broadcast receiving apparatus is in a predetermined state, the controller may set the remote control apparatus to a mode to consume less power.

The predetermined state may represent that the broadcast receiving apparatus is turned off.

If it is determined that the broadcast receiving apparatus is in the predetermined state, the controller may set the remote control apparatus to a first mode in which power consumption is reduced, and if the user command is not input through the user input unit for a predetermined time, the controller may set the remote control apparatus to a second mode in which power consumption is reduced.

Less power may be consumed in the first mode than in the second mode.

If it is determined that the broadcast receiving apparatus is turned on, the controller may set the remote control apparatus to active mode.

The remote control apparatus may further comprise a display, wherein if it is determined that video information is received from the broadcast receiving apparatus through the communication module, the controller may activate the display, and display the received information on the display.

The video information may comprise at least one of: information stored in the broadcast receiving apparatus; information acquired by the broadcast receiving apparatus from an external source; information to inform a user of a predetermined condition; and information relating to states of devices adjacent to the broadcast receiving apparatus.

The user input unit may receive the user command by detecting at least one of a user manipulation of elements of the remote control apparatus, and the user moving the remote control apparatus.

According to another exemplary aspect of the present invention, there is provided a method for setting a mode of a remote control apparatus connected to a broadcast receiving apparatus for communication, the method comprising transmitting an input user command to the broadcast receiving apparatus; and setting an operation mode of the remote control apparatus according to information regarding a state of the broadcast receiving apparatus received from the broadcast receiving apparatus.

If it is determined that the broadcast receiving apparatus is in a predetermined state, the setting may set the remote control apparatus to a mode to consume less power.

The predetermined state may represent that the broadcast receiving apparatus is turned off.

If it is determined that the broadcast receiving apparatus is in the predetermined state, the setting may set the remote control apparatus to a first mode to consume less power, and if the user command is not input through the user input unit for a predetermined time, the setting may set the remote control apparatus to a second mode to consume less power.

Less power may be consumed in the first mode than in the second mode.

If it is determined that the broadcast receiving apparatus is turned on, the setting may set the remote control apparatus to an active mode.

The method may comprise activating a display if video information is received from the broadcast receiving apparatus; and displaying the received video information on the display.

The video information may comprise at least one of: information stored in the broadcast receiving apparatus; information acquired by the broadcast receiving apparatus from an external source; information to inform a user of a predetermined condition; and information relating to states of devices adjacent to the broadcast receiving apparatus.

The user command may be input by detecting at least one of a user manipulation of elements of the remote control apparatus, and the user moving the remote control apparatus.

According to another exemplary aspect of the present invention, there is provided a broadcast receiving apparatus which receives broadcast, and provides a user with the received broadcast, the apparatus comprising a communication module which is connected to a remote control apparatus for communication; and a controller which controls the broadcast receiving apparatus according to a user command input from the remote control apparatus through the communication module, and transmits information regarding a state of the broadcast receiving apparatus to the remote control apparatus through the communication module in order to set an operation mode of the remote control apparatus according to the information regarding a state of the broadcast receiving apparatus.

The state of the broadcast receiving apparatus may comprise at least one of a power off state and a power on state, and the operation mode of the remote control apparatus may comprise a mode to consume less power of the remote control apparatus.

The controller may transmit the user command input through an operating element of the broadcast receiving apparatus to the remote control apparatus through the communication module.

According to another exemplary aspect of the present invention, there is provided a method for controlling a broadcast receiving apparatus which receives broadcast, and provides a user with the received broadcast, the apparatus comprising controlling the broadcast receiving apparatus according to a user command input from a remote control apparatus; and transmitting information regarding a state of the broadcast receiving apparatus to the remote control apparatus in order to set an operation mode of the remote control apparatus according to the information regarding a state of the broadcast receiving apparatus.

The state of the broadcast receiving apparatus may comprise at least one of a power off state and a power on state, and the operation mode of the remote control apparatus may comprise a mode to consume less power of the remote control apparatus.

The method may further comprise transmitting the user command input through an operating element of the broadcast receiving apparatus to the remote control apparatus.

According to another exemplary aspect of the present invention, there is provided a broadcast receiving system, comprising a remote control apparatus which transmits an input user command; and a broadcast receiving apparatus which controls an operation according to the user command received from the remote control apparatus, and transmits information regarding a state thereof to the remote control apparatus, wherein the remote control apparatus sets an operation mode thereof according to the information received from the broadcast receiving apparatus.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
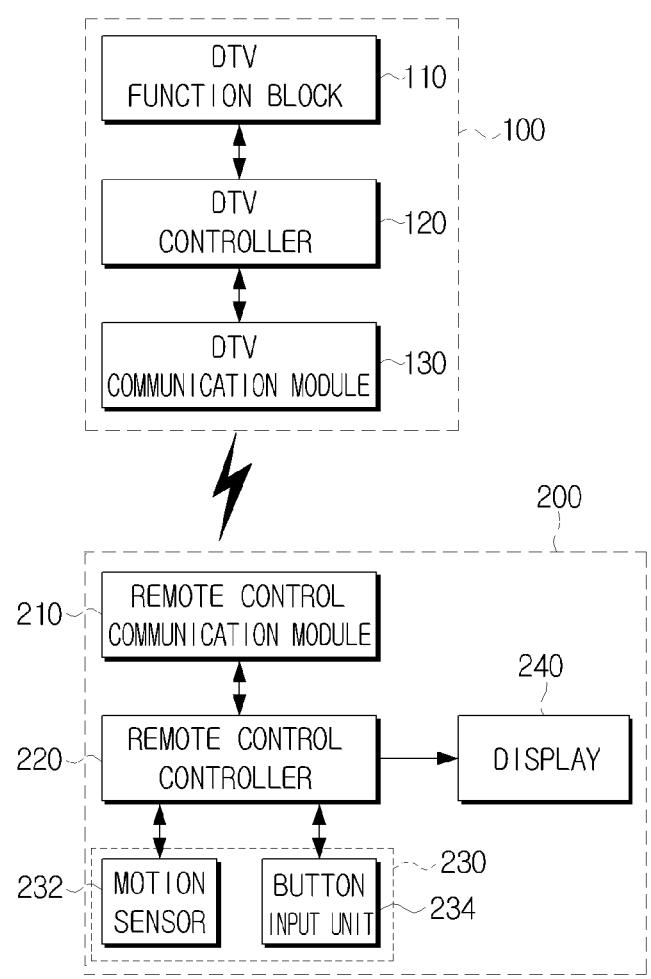
FIG. 1 is a view of illustrating an exemplary broadcast receiving system applicable to the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a view of illustrating a broadcast receiving system applicable to the present invention. Referring to FIG. 1, a broadcast receiving system comprises a DTV 100 as a broadcast receiving apparatus and a remote controller 200.

The DTV 100 provides a user with broadcast received over wire or wirelessly, and the remote controller 200 receives user inputs regarding the DTV 100. The DTV 100 and the remote controller 200 are communicably linked to each via radio frequency (RF) communication. The remote controller 200 may transmit the input user command to the DTV 100.

The DTV 100 comprises a DTV function block 110, a DTV controller 120, and a DTV communication module 130 as illustrated in FIG. 1.

The DTV function block 110 performs basic functions of the DTV 100. That is, the DTV function block 110 receives a digital broadcast signal, demodulates the received digital broadcast signal, decodes the demodulated digital broadcast signal, processes the decoded digital broadcast signal, and outputs the processed digital broadcast signal to provide a user with digital broadcast.

The DTV communication module 130 is communicably linked to the remote controller 200 for RF communication.

The DTV controller 120 controls the operation of the DTV function block 110 according to a user command which is received from the remote controller 200 through the DTV communication module 130.

The DTV controller 120 transmits information regarding a state of the operation of the DTV 100 to the remote controller 200 through the DTV communication module 130. The operation state of the DTV 100 may include power on and off states.

The remote controller 200 comprises a remote control communication module 210, a remote control controller 220, a user input unit 230, and a display 240.

The remote control communication module 210 is communicably linked to the DTV 100 for RF communication.

The user input unit 230 comprises a motion sensor 232 and a button input unit 234 to receive a user command.

The motion sensor 232 senses movement of the remote controller 200 according to a user manipulation, and transmits the sensed result to the remote control controller 220. In particular, a user moves the remote controller 200 up or down, or to the right or left, or rotates the remote controller 200 while holding the remote controller 200. The motion sensor 232 senses a direction and degree of movement of the remote controller 200, and transmits the sensed result to the remote control controller 220.

The movement of the remote controller 200, caused by a user, may be processed as a user command. For example, if a user moves the remote controller 200 up or down, or to the right or left, this may be input as a command directing to move a cursor or a pointer on the DTV 100 up or down, or to the right or left.

The motion sensor 232 may be embodied as a gyro sensor to perform the above functions.

The button input unit 234 may comprise a power button, a volume button, and a selection button, and a user may input a desired command by pressing a corresponding button.

The remote control controller 220 transmits a user command input through the user input unit 230 to the DTV 100 through the remote control communication module 210.

The remote control controller 220 sets an operation mode of the remote controller 200 based on a DTV operation state and a user command input state representing that a user has not input the remote controller 200 for a predetermined period of time.

The remote control controller 220 sets the remote controller to an active mode, an idle mode, or a sleep mode according to the above two states, which will be explained below in detail.

Figure 2:
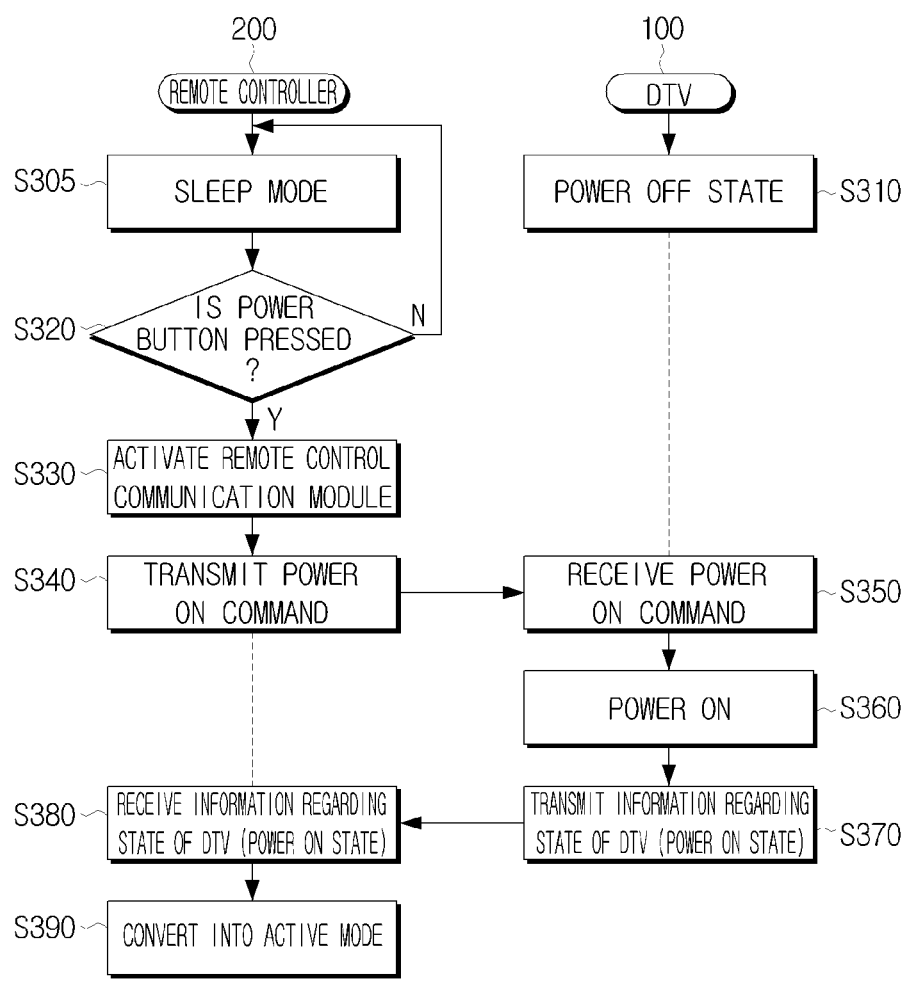
FIG. 2 is a view illustrating the operation between a remote controller and a digital television (DTV) when a user desires to turn on the DTV using the remote controller according an exemplary embodiment of the present invention.

FIG. 2 is a view illustrating the operation between the remote controller 200 and the DTV 100 when a user desires to turn on the DTV using the remote controller 200.

The remote controller 200 is in the sleep mode (S305), and the DTV 100 is in a power off state (S310).

In the sleep mode, the DTV 100 is placed in a state of waiting for a power on command and the remote controller 200 only operates to sense a user pressing on the power button.

Even when the DTV 100 is turned off, the DTV controller 120 and the DTV communication module 130 are in an activation state to receive a user command transmitted from the remote controller 200.

If a user presses the power button on the button input unit 234 (S320-Y), the remote control controller 220 senses that the power button is pressed, and activates the remote control communication module 210 (S330). The remote control controller 220 transmits a power on command to the DTV 100 through the remote control communication module 210 (S340).

The DTV controller 120 of the DTV 100 receives the power on command transmitted in operation S340 through the DTV communication module 130 (S350). The DTV controller 120 activates the DTV function block 110 to turn on the DTV 100 (S360).

The DTV controller 120 transmits information regarding a state of the DTV 100, that is a power on state, to the remote controller 200 through the DTV communication module 130 (S370).

The remote control controller 220 receives the information regarding the state of the DTV 100 transmitted in operation S370 through the remote control communication module 210 (S380).

The remote control controller 220 determines the power on state of the DTV 100 from the information received from the DTV 100, and activates the display 240, the motion sensor 232, the button input unit 234, and all the buttons of the button input unit 234 excluding the power button to change the remote controller 200 to active mode (S390).

As the power button has already been activated, activation of the power button is excluded in operation S390.

When operation S390 is finished, all the elements of the remote controller 200 are activated, which represents that the remote controller 200 is set to the active mode.

Figure 3:
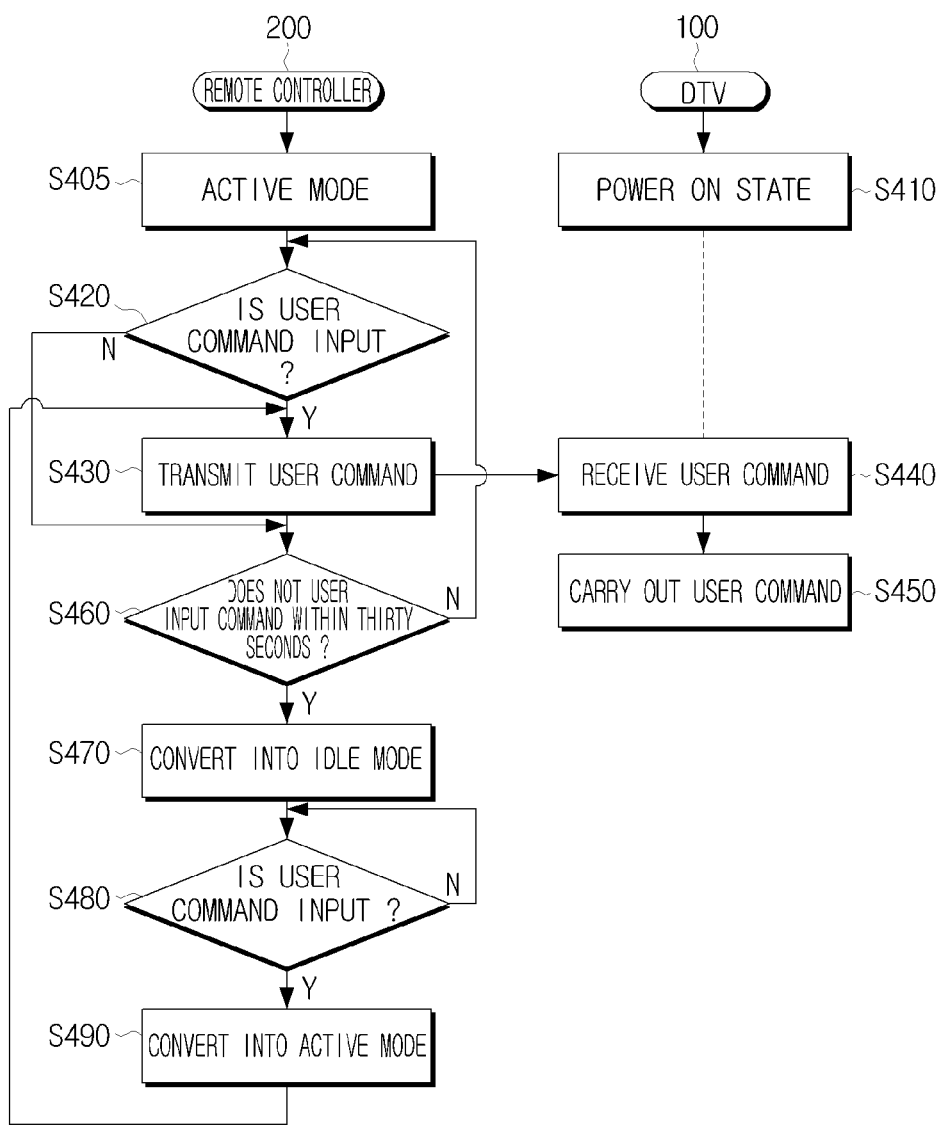
FIG. 3 is a view illustrating the operation between a remote controller and a DTV after the DTV is turned on according an exemplary embodiment of the present invention.

Hereinbelow, the operation between the remote controller 200 and the DTV 100 after the DTV 110 is turned on will be explained in detail with reference to FIG. 3.

The remote controller 200 is in the active mode (S405), and the DTV 100 is in a power on state (S410).

If a user inputs a command using the user input unit 230 (S420-Y), the remote control controller 220 senses the input user command, and transmits the sensed user command to the DTV 100 through the remote control communication module 210 (S430).

The input of the user command in operation S420 is determined according to: i) whether the motion sensor 232 senses movement of the remote controller 200; or ii) according to whether a user presses a button of the button input unit 234.

The DTV controller 120 of the DTV 100 receives the user command transmitted in operation S430 through the DTV communication module 130 (S440). The DTV controller 120 controls the DTV function block 110 to carry out the received user command (S450).

If a user does not input a command within thirty seconds (S420-N and S460-Y), the remote control controller 220 sets the remote controller 200 to the idle mode (S470).

In the idle mode, the display 240 is set to an inactivation state, and the remote communication module 210, the motion sensor 232, and the button input unit 234 are maintained in an activation state.

Accordingly, in operation S470, the remote control controller 220 sets the display 240 to an inactivation state.

If a user inputs a command using the user input unit 230 while the remote controller 200 is in the idle mode (S480-Y), the remote control controller 220 sets the remote controller 200 to the active mode (S490).

Accordingly, in operation S490, the remote control controller 220 sets the display inactivated by operation S470 to an activation state. After performing operation S490, the operation returns to operation S430.

Figure 4:
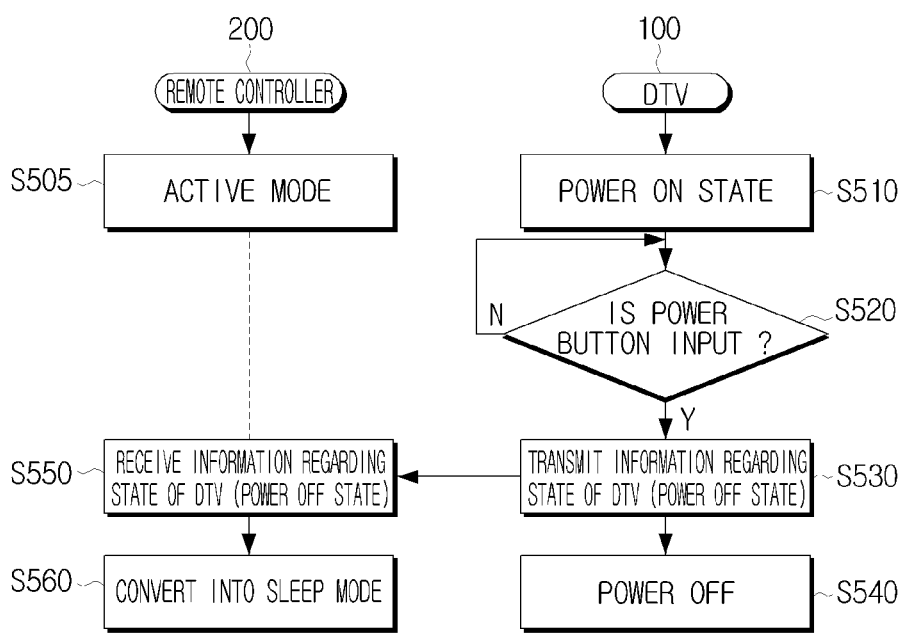
FIG. 4 is a view illustrating the operation between a remote controller and a DTV when a use desires to turn off the DTV using a power button provided to the DTV according an exemplary embodiment of the present invention.

FIG. 4 is a view illustrating the operation between the remote controller 200 and the DTV 100 when a use desires to turn off the DTV 1100 using a power button of the DTV 100 instead of the remote controller 200.

The remote controller 200 is in the active mode (S505), and the DTV 100 is in a power on state (S510).

If a user presses a power button of the DTV 100 (S520-Y), the DTV controller 120 senses that the power button is pressed, and transmits information regarding a state of the DTV 100, that is a power off state, to the remote controller 200 through the DTV communication module 130 (S530). The DTV controller 120 inactivates the DTV function block 110 of the DTV 100 to turn off the DTV 100 (S540).

The remote control controller 220 receives the information regarding the state of the DTV 100 transmitted in operation S530 through the remote control communication module 210 (S550).

The remote control controller 200 perceives that the DTV 100 is turned off based on the received information, and inactivates the remote control communication module 210, the display 240, the motion sensor 232, and all the buttons of the button input unit 234 excluding the power button to set the remote controller 200 to the sleep mode (S560). That is, in operation S560, only the function to sense whether the power button is input is activated, while the rest of the functions are inactivated.

FIG. 4 describes the operation between the remote controller 200 and the DTV 100 when a user desires to turn off the DTV 100 using the power button of the DTV 100. However, the user may use a power button of the remote controller 200 instead of the power button of the DTV 100 to turn off the DTV 100.

The remote control controller 220 senses that the user inputs the power button of the remote controller 200, and transmits a power off command to the DTV 100 through the remote control communication module 210.

The DTV controller 120 receives the power off command through the DTV communication module 130, and inactivates the DTV function block 110 to turn off the DTV 100.

The DTV controller 120 transmits information regarding a state of the DTV 100, that is a power off state to the remote controller 220 through the DTV communication module 130. The remote control controller 220 receives the information regarding the power off state of the DTV 100 through the remote control communication module 210.

The remote control controller 220 perceives the power off state of the DTV 100 based on the received information, and thus sets the remote controller 200 to the sleep mode.

According to the exemplary embodiments of the present invention, when a user presses the power button of the DTV 100 to turn off the DTV 100, the remote controller 200 is set to the sleep mode. However, this is merely an exemplary embodiment of the present invention for a convenient description. Alternatively, when the user presses the power button of the DTV 100 to turn on the DTV 100, it is possible for the remote controller 200 to be set to the active mode.

According to the exemplary embodiments of the present invention, the user input unit 230 includes the motion sensor 232 to sense the movement of the remote controller 200 and the button input unit 234 to receive a user command. However, this is merely an exemplary embodiment of the present invention. Accordingly, the user input unit 230 may employ other devices such as a touch screen, a joystick, and a jog wheel, and a user may input a user command using such devices.

While the state of the DTV 100 is classified as a power on and power off states according to the exemplary embodiments of the present invention, this is merely an exemplary embodiment of the present invention. Accordingly, other states of the DTV 100 are applicable to the present invention. For example, when the DTV 100 is in idle state, or is connected to external apparatuses, the remote controller 200 may be set to a predetermined mode.

The operation mode of the remote controller 200 is classified as the active mode, the idle mode, and the sleep mode in the exemplary embodiment of the present invention. As this is merely an exemplary embodiment of the present invention, the operation mode of the remote controller 200 may be classified as other modes.

Since the idle mode and sleep mode save electrical consumption, any low power consuming modes for the remote controller 200 may be applicable to replace the idle or sleep mode of the present invention. That is, the other modes with different names of descriptions may be applied to the present invention.

The exemplary embodiments of the present invention also do not limit that the remote controller 200 should be set to a lower power consuming mode upon determining the DTV to be in a predetermined state. Therefore, other modes are applicable to the remote controller 200 according to the exemplary embodiment of the present invention.

For example, if it is determined that the DTV 100 transmits video information to the remote controller 200, the remote controller 200 may be set to a mode for activating the display 240, and display the received video information on the display 240.

The video information may be information stored in the DTV 100, information acquired from an external source such as external apparatus or the Internet, information informing a user of a predetermined state, or information regarding a state of devices adjacent to the DTV 100.

For example, the information informing a user of a predetermined state may include a notification that a predetermined alarm time has expired, and the information regarding a state of devices adjacent to the DTV 100 may include a notification that a short message service (SMS) is received in a mobile phone.

While the DTV 100 is connected to the remote controller 200 for the RF communication in the exemplary embodiment of the present invention described above, this is merely an exemplary embodiment of the present invention. The DTV 100 may be connected to the remote controller 200 for other communication.

While the DTV 100 according to the exemplary embodiment of the present invention is described as a broadcast receiving apparatus, other broadcast receiving apparatuses may be applied to the present invention, such as other electric devices.

As described above, according to the present invention, an operation mode of a remote control apparatus can be set automatically according to information regarding a state of a broadcast receiving apparatus. Accordingly, less power is consumed in the remote control apparatus than in a conventional remote control apparatus.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A portable electronic apparatus, comprising:
a display unit;
a user input unit configured to receive a user input;
a communication unit configured to communicate with a broadcast receiving apparatus; and
a controller configured to control the communication unit to transmit a command corresponding to the user input to the broadcast receiving apparatus, to control the display unit to operate in an active mode to display a video image based on video data received from the broadcast receiving apparatus via the communication unit and to change an operation mode of the display unit from the active mode to a sleep mode based on information regarding a power state of the broadcast receiving apparatus which is received from the broadcast receiving apparatus while the display unit operates in the active mode to display the video image based on the video data received from the broadcast receiving apparatus.

2. The portable electronic apparatus of claim 1, wherein when the controller determines that the broadcast receiving apparatus is in a predetermined power state based on the information, the controller sets portable electronic apparatus to an operation mode to consume less power.

3. The portable electronic apparatus of claim 2, wherein the predetermined power state is that the broadcast receiving apparatus is turned off.

4. The portable electronic apparatus of claim 1, wherein when the controller determines that the broadcast receiving apparatus is in a predetermined power state based on the information, the controller sets the portable electronic apparatus to a first mode in which power consumption is reduced, and when the user input is not received through the user input unit for a predetermined period of time, the controller sets the portable electronic apparatus to a second mode in which power consumption is reduced.

5. The portable electronic apparatus of claim 4, wherein the portable electronic apparatus consumes less power in the first mode than in the second mode.

6. The portable electronic apparatus of claim 1, wherein when the controller determines that the broadcast receiving apparatus is turned on based on the information, the controller sets the portable electronic apparatus to an active mode.

7. The portable electronic apparatus of claim 1, wherein the user input unit receives the user input by detecting at least one of a user manipulation of elements of the portable electronic apparatus, and the user moving the portable electronic apparatus.

8. The portable electronic apparatus of claim 1, wherein the changing is changing a normal mode to a power saving mode to consume less power than the normal mode.

9. The portable electronic apparatus of claim 3, wherein the information regarding a state comprises at least one of information regarding on or off of the broadcast receiving apparatus and information regarding a connection to an external device.

10. The portable electronic apparatus of claim 1, the controller determines the operation mode based on the information received from the broadcast receiving apparatus and the user input received through the user input unit.

11. A method for setting a mode of a portable electronic apparatus communicably linked to a broadcast receiving apparatus, the method comprising:
receiving, by the portable electronic apparatus, information regarding a state of the broadcast receiving apparatus; and
setting an operation mode of the portable electronic apparatus to a predetermined mode according to the received information regarding the state of the broadcast receiving apparatus,
wherein the setting comprises controlling a display unit of the portable electronic apparatus to operate in an active mode to display a video image based on video data received from the broadcast receiving apparatus and to change an operation mode of the display unit from the active mode to a sleep mode based on information regarding the power state of the broadcast receiving apparatus which is received from the broadcast receiving apparatus while the display unit operates in the active mode to display the video image based on the video data received from the broadcast receiving apparatus.

12. The method of claim 11, wherein when it is determined that the broadcast receiving apparatus is in a predetermined power state based on information regarding the state of the broadcast receiving apparatus, the setting sets the portable electronic apparatus to a mode to consume less power.

13. The method of claim 12, wherein the predetermined power state is that the broadcast receiving apparatus is turned off.

14. The method of claim 11, wherein when it is determined that the broadcast receiving apparatus is in a predetermined power state based on information regarding the state of the broadcast receiving apparatus, the setting sets the portable electronic apparatus to a first mode to consume less power, and when a user input is not input through a input unit for a predetermined period of time, the setting sets the portable electronic apparatus to a second mode to consume less power.

15. The method of claim 14, wherein the portable electronic apparatus consumes less power in the first mode than in the second mode.

16. The method of claim 11, wherein when it is determined that the broadcast receiving apparatus is turned on based on information regarding the state of the broadcast receiving apparatus, the setting sets the portable electronic apparatus to an active mode.

17. The method of claim 11, wherein a command corresponding to a user input transmitted to the broadcast receiving apparatus is the user input by detecting at least one of a user manipulation of elements of the portable electronic apparatus, and a user moving the portable electronic apparatus.

18. The method of claim 11, wherein the setting comprises:
determining whether the broadcast receiving apparatus is connected to an external apparatus based on the received information; and
setting the operation mode of the portable electronic apparatus to the predetermined mode if it is determined that the broadcast receiving apparatus is connected to the external apparatus.

19. The method of claim 11, wherein the predetermined mode is one of a plurality of operation modes setting power consumption of the portable electronic apparatus,
wherein the setting the operation mode comprises setting the operation mode to a first mode when the broadcast receiving apparatus is turned on, setting the operation mode to a second mode when a user input is not received for a predetermined time while the broadcast receiving apparatus is connected to the external apparatus or the broadcast receiving apparatus is turned on, and setting the operation mode to a third mode when the broadcast receiving apparatus is turned off, and
wherein the second mode consumes less power than the first mode, and consumes more power than the third mode.

20. The method of claim 19, wherein the first mode is an active operation mode where the portable electronic apparatus is activated as a whole, the third mode is a sleep mode where only a power button of the portable electronic apparatus is activated, and the second mode is an idle mode where the power button and a button related to communication and a motion detection sensor are activated.

21. A non-transitory computer-readable recording medium having a program recorded thereon that causes a portable electronic apparatus to execute a method for setting a mode of the portable electronic apparatus communicably linked to a broadcast receiving apparatus, the method comprising:
receiving by the portable electronic apparatus information regarding a power state of the broadcast receiving apparatus; and
setting an operation mode of the portable electronic apparatus to a predetermined mode according to the received information regarding the power state of the broadcast receiving apparatus,
wherein the setting comprises controlling a display unit of the portable electronic apparatus to operate in an active mode to display a video image based on video data received from the broadcast receiving apparatus and to change an operation mode of the display unit from the active mode to a sleep mode based on information regarding the power state of the broadcast receiving apparatus which is received from the broadcast receiving apparatus while the display unit operates in the active mode to display the video image based on the video data received from the broadcast receiving apparatus.

22. The non-transitory computer-readable recording medium of claim 21, wherein the setting sets the operation mode regarding power consumption of the portable electronic apparatus to a low power consumption mode, when it is determined that the broadcast receiving apparatus is turned off.

23. The non-transitory computer readable recording medium of claim 21, wherein the setting comprises:
   determining whether the broadcast receiving apparatus is connected to an external apparatus based on the received information; and
   setting an operation mode of the portable electronic apparatus to the predetermined mode if it is determined that the broadcast receiving apparatus is connected to the external apparatus.

24. The non-transitory computer readable recording medium of claim 23, wherein the predetermined mode is a power saving mode.

\* \* \* \* \*